(12) United States Patent
Akhtar

(10) Patent No.: US 6,418,139 B1
(45) Date of Patent: Jul. 9, 2002

(54) MECHANISM TO GUARANTEE QUALITY OF SERVICE TO REAL-TIME TRAFFIC ON IP NETWORKS

(75) Inventor: Shahid Akhtar, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/200,262

(22) Filed: Nov. 25, 1998

(51) Int. Cl.[7] .............................................. H04L 12/66
(52) U.S. Cl. ........................ 370/356; 370/225; 370/401
(58) Field of Search ................................. 370/356, 351, 370/389, 392, 252, 254, 255, 229, 231, 235, 395.5, 464, 465, 466, 467, 468, 400, 401, 216, 217, 221, 225, 228, 395.52

(56) References Cited

U.S. PATENT DOCUMENTS

| | | | | |
|---|---|---|---|---|
| 6,006,253 A | * | 12/1999 | Kumar et al. ............... | 709/204 |
| 6,026,077 A | * | 2/2000 | Iwata ......................... | 370/254 |
| 6,069,889 A | * | 5/2000 | Feldman et al. ............ | 370/351 |
| 6,098,107 A | * | 8/2000 | Navaez-Guarnieri et al. .... | 709/239 |
| 6,151,635 A | * | 11/2000 | Bare .......................... | 709/241 |
| 6,173,324 B1 | * | 1/2001 | D'Souza ..................... | 709/224 |
| 6,185,612 B1 | * | 2/2001 | Jensen et al. ............... | 709/223 |
| 6,205,146 B1 | * | 3/2001 | Rochberger et al. ........ | 370/395 |

* cited by examiner

*Primary Examiner*—Dang Ton
*Assistant Examiner*—Brian Nguyen
(74) *Attorney, Agent, or Firm*—Thomas A. Gigliotti; Bracewell & Patterson, L.L.P.

(57) ABSTRACT

A system for routing of data traffic on a communications network comprising a plurality of gatekeepers interlinked to form a network wherein the plurality of gatekeepers control bandwidth and routing of data packets towards destination terminals. A plurality of routers aggregate real time flow of data packets through said gatekeepers, and terminals which are connected to the network via the gatekeepers, negotiate connection parameters. Real time flow of said data packets is directed from one end point terminal to another utilizing the gatekeepers and the routers.

17 Claims, 8 Drawing Sheets

MECHANISM TO GUARANTEE QUALITY OF SERVICE TO REAL-TIME TRAFFIC ON IP NETWORKS

BACKGROUND OF THE INVENTION

1. Technical Field

The present invention relates generally to a communications system and in particular to a method and system for routing data traffic within the communications system. Still more particularly, the present invention relates to a system employed for routing real-time data traffic in an Internet Protocol (IP) communications network.

2. Description of the Related Art

The development of computerized information resources such as the "Internet" and the proliferation of "Web" browsers, allow users of data-processing systems to link with other servers and networks, and thus retrieve vast amounts of electronic information heretofore unavailable in an electronic medium. Such electronic information is increasingly displacing more conventional means of information transmission such as newspapers, magazines, and even television. In electronic communications, a set of computer networks which are possibly dissimilar from one another are joined together by "gateways" that handle data transfer and the conversion of messages from the sending network to the protocols utilized by the receiving network, with packets if necessary. A gateway is a device utilized to connect dissimilar networks (i.e., networks utilizing different communication protocols) so that electronic information can be passed from one network to the other. Gateways transfer electronic information converting such information to a form compatible with the protocols utilized by the second network for transport and delivery. The term "Internet" is an abbreviation for "internetwork," and refers commonly to the collection of networks and gateways that utilize the TCP/IP suite of protocols, which are well-known in the art of computer networking. TCP/IP is an acronym for "Transport Control Protocol/Internet Protocol," a software protocol developed by the U.S. Department of Defense for communication between computers.

The evolution of personal computers over the last decade has accelerated the "Web" and "Internet" toward useful everyday applications. Nearly every computer sold over the last several years has or will, at some point, become "online" to an Internet service provider. Somewhere between 20 and 30 million people around the globe utilize some form of Internet service on a regular basis. The graphical portion of the World Wide Web itself is usually stocked with more than twenty-two million "pages" of content," with over one million new pages added every month.

Free or relatively inexpensive computer software applications such as Internet "search engines" make it simple to track down Internet sites where an individual can obtain a topic of interest. The market for Internet access and related applications is explosive and is growing faster than expected, doubling in size approximately every three months.

Advancements in communications arise from changing user needs and demands. Previously, public network needs were driven by telephoning, voice data. Data traffic has grown slowly until recently. With the lower cost in telecommunications and the higher increase in processing power of computers, the numbers of users accessing communications networks has increased. The needs of these users include, for example, video telephone, low cost video conferencing, imaging, High Definition Television (HDTV), and other applications requiring multimedia data transfers. Multimedia combines different forms of media in the communication of information between a user and a data processing system such as a personal computer or network computer. A multimedia application is an application that uses different forms of communications within a single application. Multimedia applications may, for example, communicate data to a user on a computer via audio, text, and video simultaneously. Such multimedia applications are usually bit intensive, real time, and very demanding on communications networks.

Internet Protocol (IP) networks are technology driving the Internet. The rise of these networks is primarily due to their acceptance as the layer 3 protocol in the enterprise networks. Most personal computers (PCs) now use transmission control protocol/IP (TCP/IP) as their networking protocol. IP has even gained acceptance as the wide area protocol since it is about 25–30% more efficient than Asynchronous Transfer Mode (ATM).

The kinds of traffic running over IP networks is of two major types. First, elastic traffic or non-real-traffic which is primarily data file transfer. Most of this traffic utilizes TCP as its transport level protocol and it can withstand delay quite well, but any corruption of data must be re-transmitted. Second, the inelastic or real-time traffic is interactive voice, video or data-conferencing. This kind of traffic does not withstand delay well since late information in an interactive session is of no use. This kind of traffic uses Real Time Protocol (RTP) as the transport protocol.

Running real-time traffic over IP networks has other significant problems also. Currently, there is no way of reserving bandwidth end-to-end in an IP network. Each IP packet takes its own route through the network. Therefore, each packet gets to its destination (in theory) through a different route and can have a different delay in getting to its destination. This causes delay variance or jitter at the destination where the packets have to be "played" for the destination user. Since most IP networks rely on routers to switch traffic and these routers are quite often based on software switching, they can introduce excessive delay for real-time services. Furthermore, a real-time IP packet can get stuck behind a long packet which can be as much as 1500 bytes. This will add significant delay to the real-time packet even if routing speed is increased.

The Internet Engineering Task Force (IETF) has standardized an approach to reserve resources (bandwidth, and switching capacity) in routers. This standard is known as Resource Reservation Protocol (RSVP). In this approach, the packet scheduler in each router must look at the packet origination and destination address and sometimes the IP port and then consult its RSVP tables to see if this packet has a reservation and then make a decision to forward it ahead of others. This places a significant additional load on the scheduler which makes serving a large number of RSVP flows traversing through a router very difficult or impossible. Most router manufacturers do not explicitly reserve resources in each router on the path as specified in the standard. Additionally, RSVP does not distinguish between data flows and voice flows. The number of data flows may be two (2) orders of magnitude more than the number of voice flows.

In the original IP standard, there was a field provided in the IP header to differentiate between types of packets. This is the type of service field. Five types of services are defined in the IP standard and another 11 possible types are yet undefined. The service types are enforced at the packet scheduler in the router which can give preferential treatment to some types of service. In addition, the weight or the link cost utilized in OSPF for routing can yield a different value for each type of service. Various kinds of priority mechanisms have been proposed for type of service enforcement. One of them is called fair queuing which can divide the link bandwidth into multiple types of service such that any type of service cannot exceed its allocated bandwidth when the other types of service are utilizing their bandwidth, but when the other types are not utilizing their bandwidth then one type of service can exceed its share of bandwidth. One of these mechanisms is called weighted fair queuing (WFQ) which can allocated any amount of bandwidth to each type of service instead of equal amount to all.

Another set of standards called H.323 (or H.323v2) have been proposed to do call control (i.e. make connections) of real-time service on IP networks. This feature allows endpoints or terminals wanting to make connections to negotiate bandwidth and coding requirements before the connection is established. In this standard there are three key players, endpoints, gatekeepers, and gateways. End-points are terminals which need to make connections. They request the connection through a gatekeeper (if one is on the network) and they also negotiate the connection parameters. Gatekeepers are entities that do bandwidth control (on LANs) and routing of connection packets towards the destination terminal. A gateway is an entity which can be thought of as a collection of end-points, but these entities also translate from other bearer protocols (such as TDM) to the IP protocol. Note that although each display distinct functions for the purpose of the claims, all three may be referred to generically as a node.

The Open Shortest Path First (OSPF) protocol is a TCP/IP Internet routing protocol. OSPF is classified as an Interior Gateway Protocol (IGP), i.e. it distributes routing information between routers belonging to a single autonomous system. It is intended to be utilized within an IP network under common administration. OSPF also provides for the authentication of routing updates, and utilizes IP multicast when sending/receiving the updates. OSPF routes packets based solely on the destination IP address found in the IP packet header. IP packets are routed "as is"—they are not encapsulated in any further protocol headers as they transit the Autonomous System (AS). OSPF is a dynamic routing protocol. It quickly detects topological changes in the AS (such as router interface failures) and calculates new loop-free routes after a period of convergence.

OSPF enables the routers to exchange information about their interfaces (whether they are up or down, how fast they go, and to whom they connect) and maintain a complete, synchronized, link state database in every router. It provides rapid, deterministic calculation of Internet routes and optimized route calculations.

Routing protocols define the rules that routers utilize to communicate with each other. Routing protocols dynamically provide the network topology information necessary to choose paths amongst routers, allowing routers to automatically choose routes and to alter them when network changes occur. Beyond these basics, routing protocols vary greatly in design, capability, implementation, and impact on network infrastructure.

By far the most widely implemented routing protocol is the Routing Information Protocol (RIP). RIP was the first common TCP/IP routing protocol and is supported by most routers. RIP became a component of TCP/IP when it was included with Berkeley Standard Distribution (BSD) UNIX in 1982. Even though RIP has many limitations, RIP's simplicity and interoperability have spurred its implementation in TCP/IP networks worldwide.

In today's complex internetworking environments, especially on the Internet, RIP's limitations have become most apparent. RIP does not scale well to larger networks, consuming large amounts of network bandwidth. Also, RIP lacks several key features that can make today's networks much more responsive and flexible.

Therefore, it would desirable to have an improved IP communications system that reduces the amount of hardware required, reduces the end-to-end delay, tolerates faults, and employs inexpensive technology. Additionally, it would be further advantageous to have an improved IP communications system that consumes less power and is scalable to handle varying amounts of total traffic.

SUMMARY OF THE INVENTION

It is one object of the present invention to provide an improved method and system for a communications system.

It is another object of the present invention to provide an improved system and method for routing data traffic within the communications system.

It is yet another object of the present invention to provide an improved system and method for routing real-time data traffic in an Internet Protocol communications network.

The above features are achieved as follows. A system is disclosed for routing of data traffic on a communications network. The system comprises of a plurality of gatekeepers interlinked to form a network wherein the plurality of gatekeepers control bandwidth and routing of data packets towards destination terminals. The system further comprises plurality of routers which aggregate real time flow of data packets through said gatekeepers, and terminals which are connected to the network via the gatekeepers and which negotiate connection parameters. Finally, a control means for directing real time flow of said data packets from one endpoint terminal to another utilizing the gatekeepers and the routers is disclosed.

In accordance with a preferred embodiment of the present invention, the system utilizes defined protocols which permit the shortest path between nodes on the network to be determined based on cost and efficiency. These shortest paths are saved within databases present in the system and are utilized to route the data. Second shortest paths are also determined to enable for continued transfer of data in the event the shortest paths are unavailable.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1A:
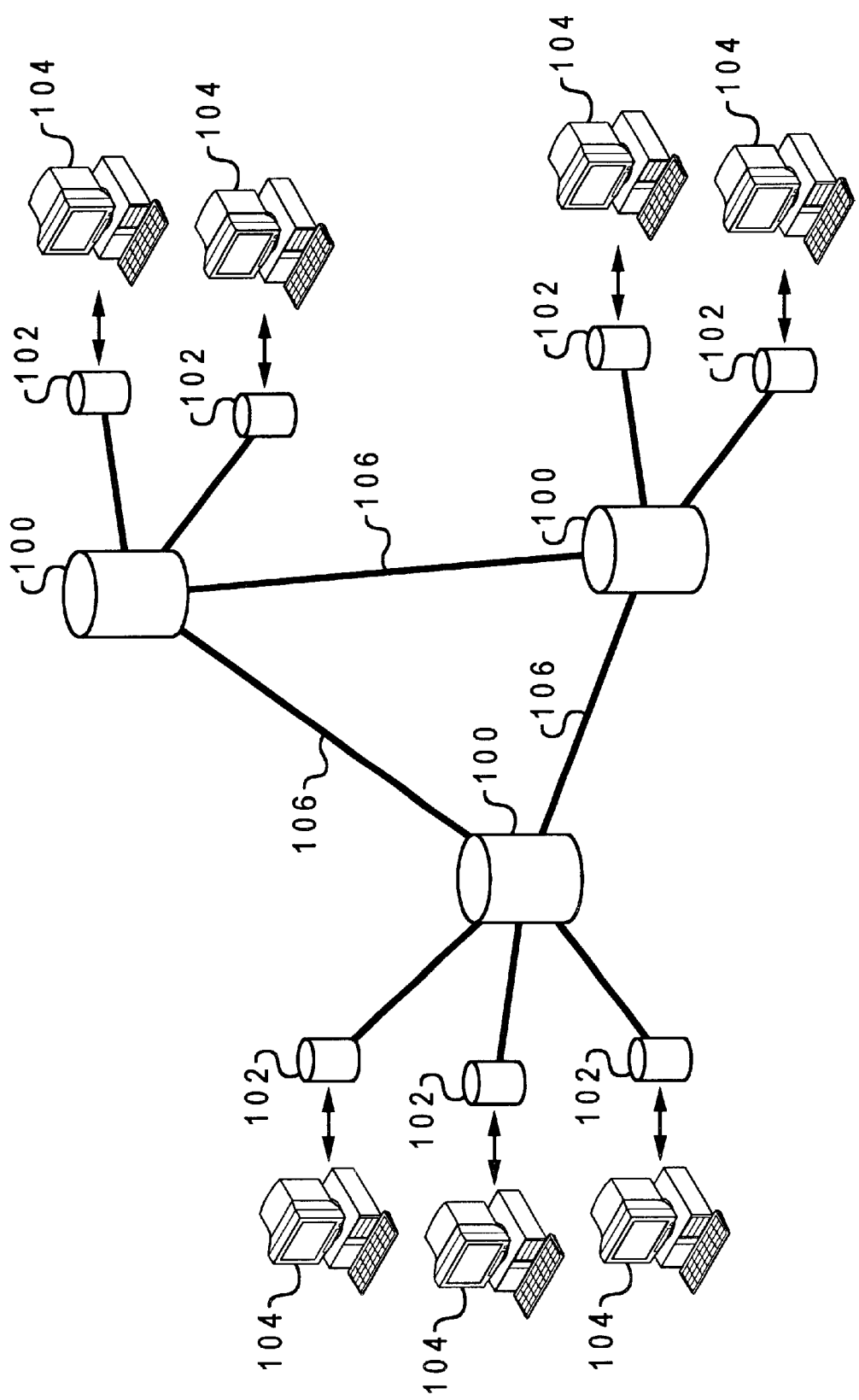
FIG. 1a depicts one representation of a physical network of a communications system according to the present invention.
Figure 1B:
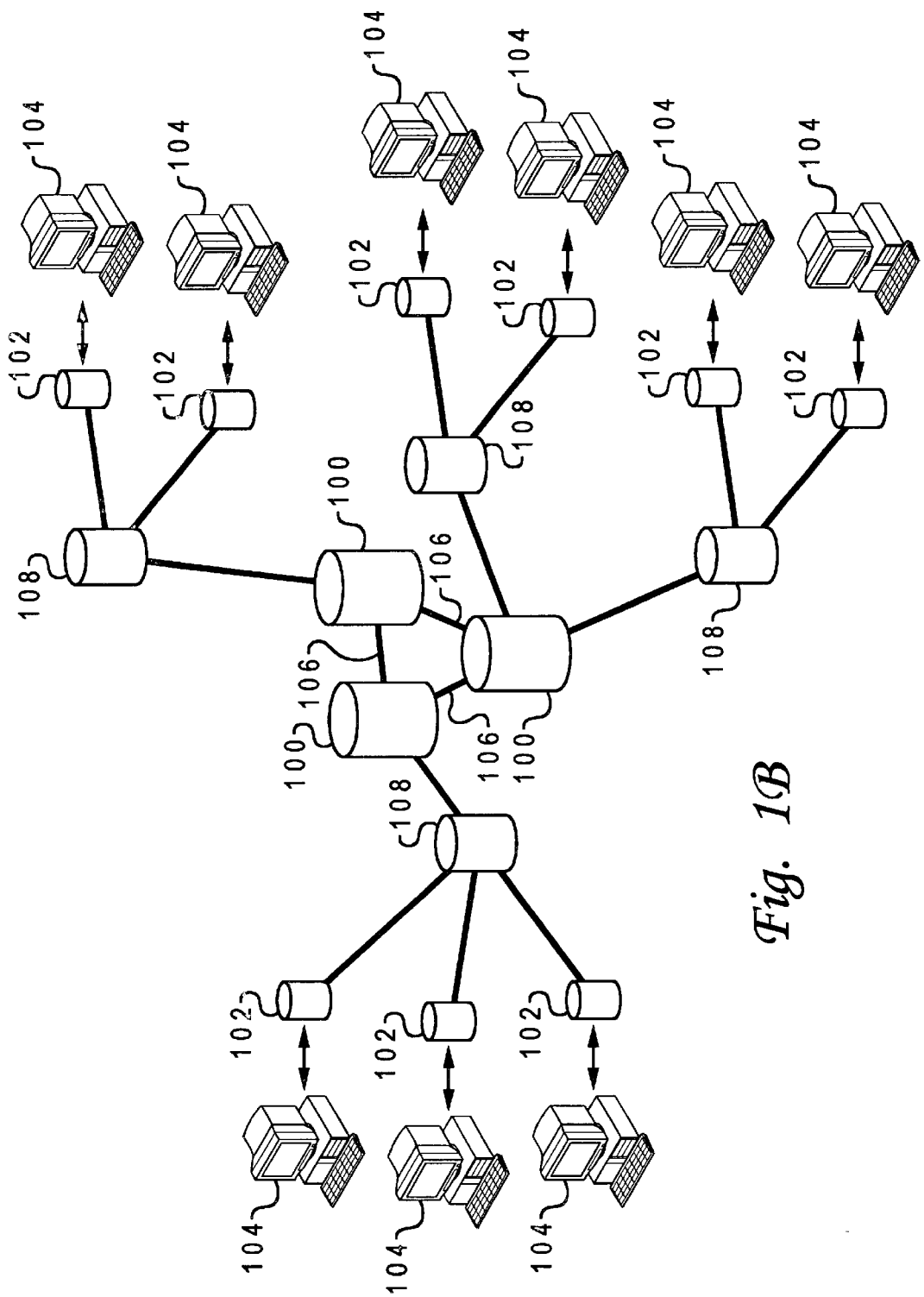
FIG. 1b depicts another representation of a physical network of a communications system according to the present invention.

With reference now to the figures, several related diagrams of a communications system are depicted according to the present invention. In particular, the present invention may be implemented with the basic network as shown in FIG. 1a and FIG. 1b. FIG. 1a depicts a network with several gatekeepers 100, endpoints 102, and terminals 104. Gatekeepers 100, endpoints 102, and terminals 104 are interconnected via links 106. Note that gatekeepers 100 are linked together to form the framework of the network while endpoints 102 and terminals 104 serve as the branches to this framework. FIG. 1b depicts a slightly more complex embodiment of the network of FIG. 1a. FIG. 1b also has gatekeepers 100, endpoints 102, and terminals 104. However, in FIG. 1b, endpoints 102 are connected first to gateways 108 which represent a node of endpoints 102. Gateways 108 are then connected to the framework of gatekeepers 100.

The idea behind the invention is to allocate bandwidth through WFQ on strategic links for real-time traffic which is defined as a type of service on the IP network. The bandwidth is then controlled through the gatekeepers on the network to guarantee a quality of service to each accepted real-time connection on the network.

The gatekeepers and the logical links connecting them may be arranged in at least the following two possible configurations. These various features of FIG. 1a and FIG. 1b are replicated in the other figures presented in this illustrative embodiment. Their respective descriptions are similar throughout and are not given further attention in the following figures of this embodiment.

Users/Customers access the network via terminals 104 which are connected to the network endpoints 102. In FIG. 1b, several customers may connect to gateways 108. Each entrance to the network could be a Point of Presence (POP) which takes data traffic from several customers or gateways 108. Gatekeepers 100 are mapped onto their physical location and links 106 are then mapped onto the physical network as the shortest path between these physical locations according to the link costs of the type of service for real-time traffic. The dimensioning of the logical links between gatekeepers 100 is done by looking at the traffic going through those links (this traffic will be multi-rate for different kinds of multi-media traffic) and allocating bandwidth utilizing a typical multi-rate blocking formula.

Figure 2:
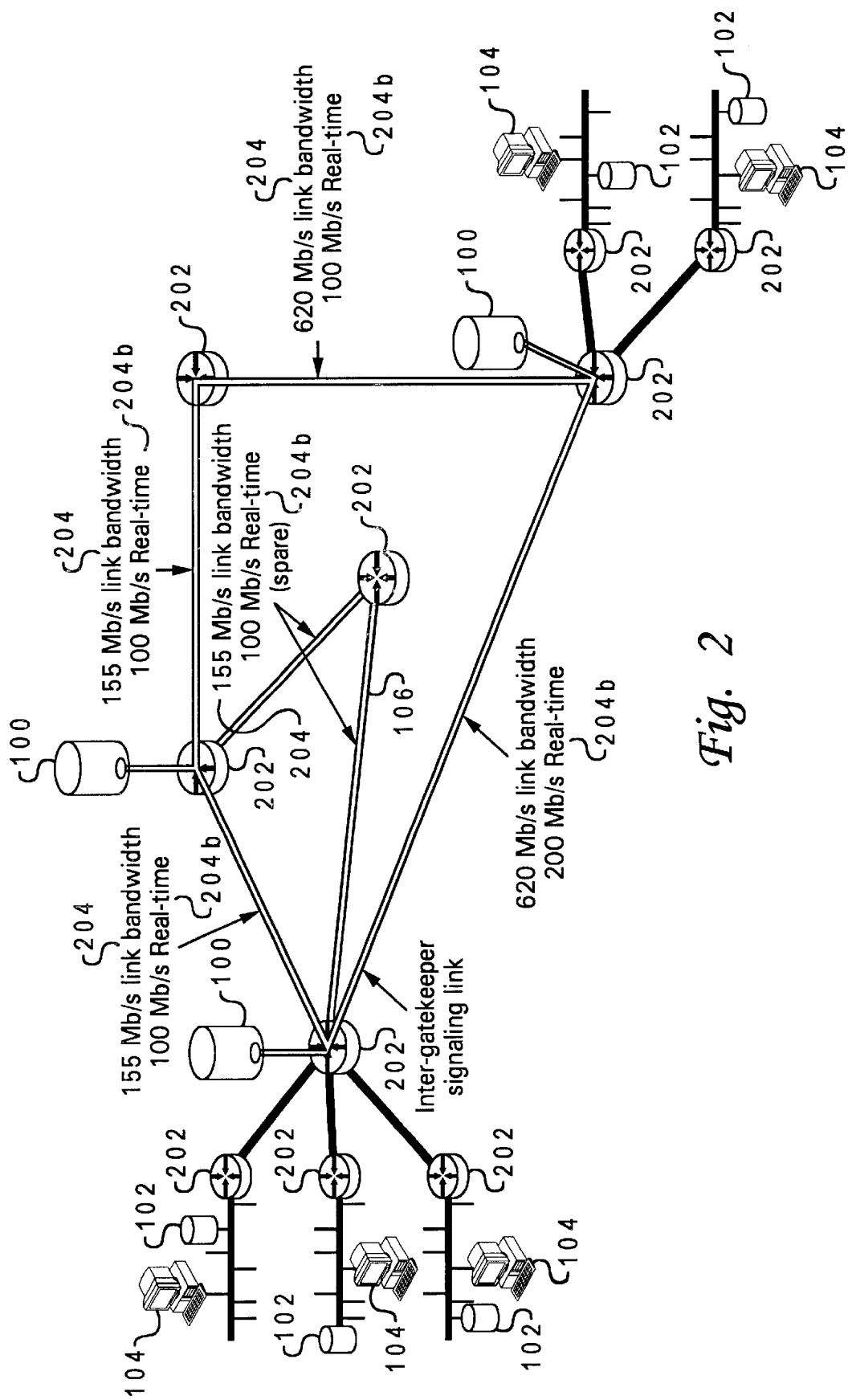
FIG. 2 is a diagram one embodiment of a communications system according to the present invention illustrating the logical network connections of the routers.

The network of FIG. 2 is an example of both the physical network of routers 202 and the network of gatekeepers 100 and their links 106. In FIG. 2, routers 202 are interconnected via links 106 which have bandwidth 204. Bandwidth 204 of link 106 is a function of the network link components and may vary within links. In the illustrated embodiment, links 106 with specific bandwidths 204 run between gatekeepers 100 and routers 202. As depicted, a portion of link 106 is allocated to real time bandwidth 204b. Routers 202 populate the entire network at every level.

Each router maintains a database describing the AS's topology (the router's link state). Each individual piece of this database is a particular router's local state (e.g., the router's usable interfaces and reachable neighbors). The router distributes its local state throughout the AS. Each router constructs a tree of shortest paths with itself as root. This shortest path gives the route to each destination in the AS. Externally derived routing information appears on the tree leaves. The tree gives the entire path to any destination network or host. However, only the next hop to the destination is utilized in the forwarding process. After the tree is created the external routing information is examined and disseminated throughout the network. The best route to any router has also been calculated. When several equal-cost routes to a destination exists, traffic is distributed equally among them. If a router's link state changes, only the changed information is propagated through the Internet, then every other router simultaneously calculates the optimal routes. Detected failures in the Internet are quickly messaged and the result is deterministic. Also, taking advantage of a new Internet path takes very little overhead time. OSPF permits for a significant reduction in routing traffic. A cost is associated with the output side of each router interface (link). This cost is typically inversely proportional to the link bandwidth, but can be set to any value by the network administrator. The lower the cost, the more likely the interface is utilized to forward data traffic.

When a router starts, it first initializes the routing protocol data structures. The router then waits for indications from the lower level protocols that its interfaces are functional. A router then utilizes the OSPF's Hello Protocol to reach neighbors. The router sends Hello packets to its neighbors, and in turn receives their Hello packets. On broadcast and point to point networks, the router dynamically detects its neighboring routers by sending its Hello packets to the multicast address AllSPFRouters. On non-broadcast networks, some configuration information may be necessary in order to discover neighbors. On broadcast and NBMA networks the Hello Protocol also elects a designated router for the network.

The router will attempt to form adjacencies with some of its newly acquired neighbors. Link state databases are synchronized between pairs of adjacent routers. On broadcast and NBMA networks, the Designated Router determines which routers should become adjacent. Adjacencies control the distribution of routing information. Routing updates are sent and received only on adjacencies.

A router periodically advertises its state, which is also called link state. Link state is also advertised when a router's state changes. A router's adjacencies are reflected in the contents of its LSAs. This relationship between adjacencies and link state allows the protocol to detect dead routers in a timely fashion.

LSAs are flooded throughout the area. The flooding algorithm is reliable, ensuring that all routers in an area have exactly the same link state database. This database consists of the collection of LSAs originated by each router belonging to the area. From this database each router calculates a shortest path tree with itself as root. This shortest path tree in turn yields a routing table for the protocol.

The routing of the H.225 messages of H.323 protocol will require that gatekeepers specify the next gatekeepers for the message. In the preferred embodiment, it is proposed that this routing be done using OSPF (or OSPFv2). The OSPF routing protocol overcomes many of the limitations of RIP. Although the current version of OSPF was first formalized in 1991, OSPF has become more widely deployed only recently. Larger ISPs and corporations alike are beginning to require the broad feature set offered by OSPF. In contrast to RIP, OSPF scales to larger networks and is much faster to converge. The most fundamental difference between OSPF and RIP is that they are based on two different algorithms. OSPF is based on the Dijkstra link state algorithm. RIP is based on the Bellman-Ford distance vector algorithm. Utilizing OSPF's link state algorithm, every router maintains a similar network map identifying all links between neighbors. Best paths are calculated from these maps. OSPF also ensures that updates sent to neighboring routers are acknowledged by neighbors, verifying that all routers have consistent network maps. Utilizing RIP's distance vector algorithm, every router creates a unique routing table identifying the best path from itself to all other routers in the network.

Figure 3:
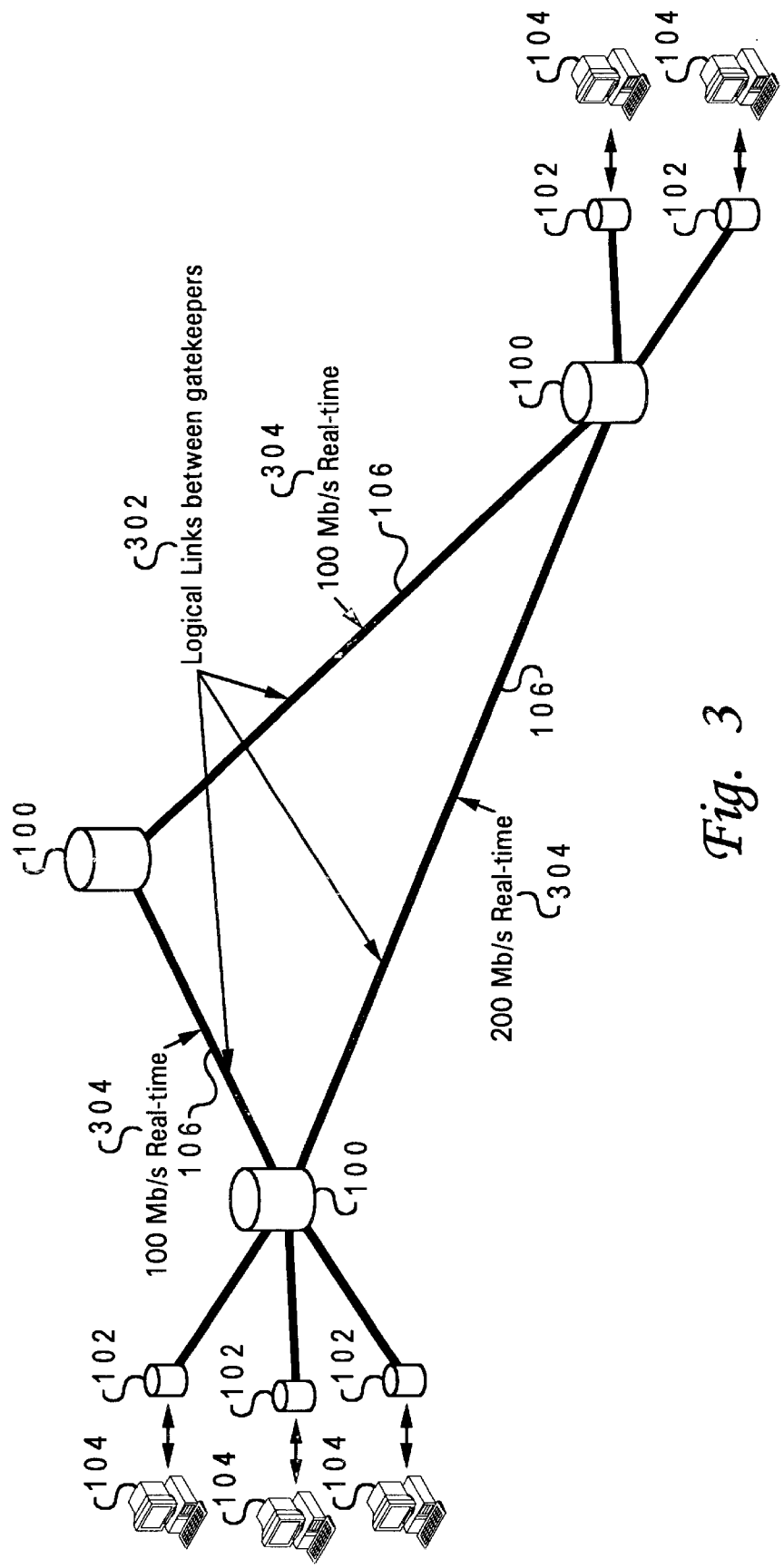
FIG. 3 depicts a logical network of gatekeepers for the communications system of FIG. 1.

Of the two protocols, OSPF's acknowledgement-oriented routing update process is far more responsive to network topology changes. Routers can make decisions faster when their network information is known to be consistent with that of other routers. FIG. 3 illustrates OSPF running at the logical network of gatekeepers 100 and will be different from the OSPF running at the router level. Each gatekeeper 100 will have a routing table.

Figure 4:
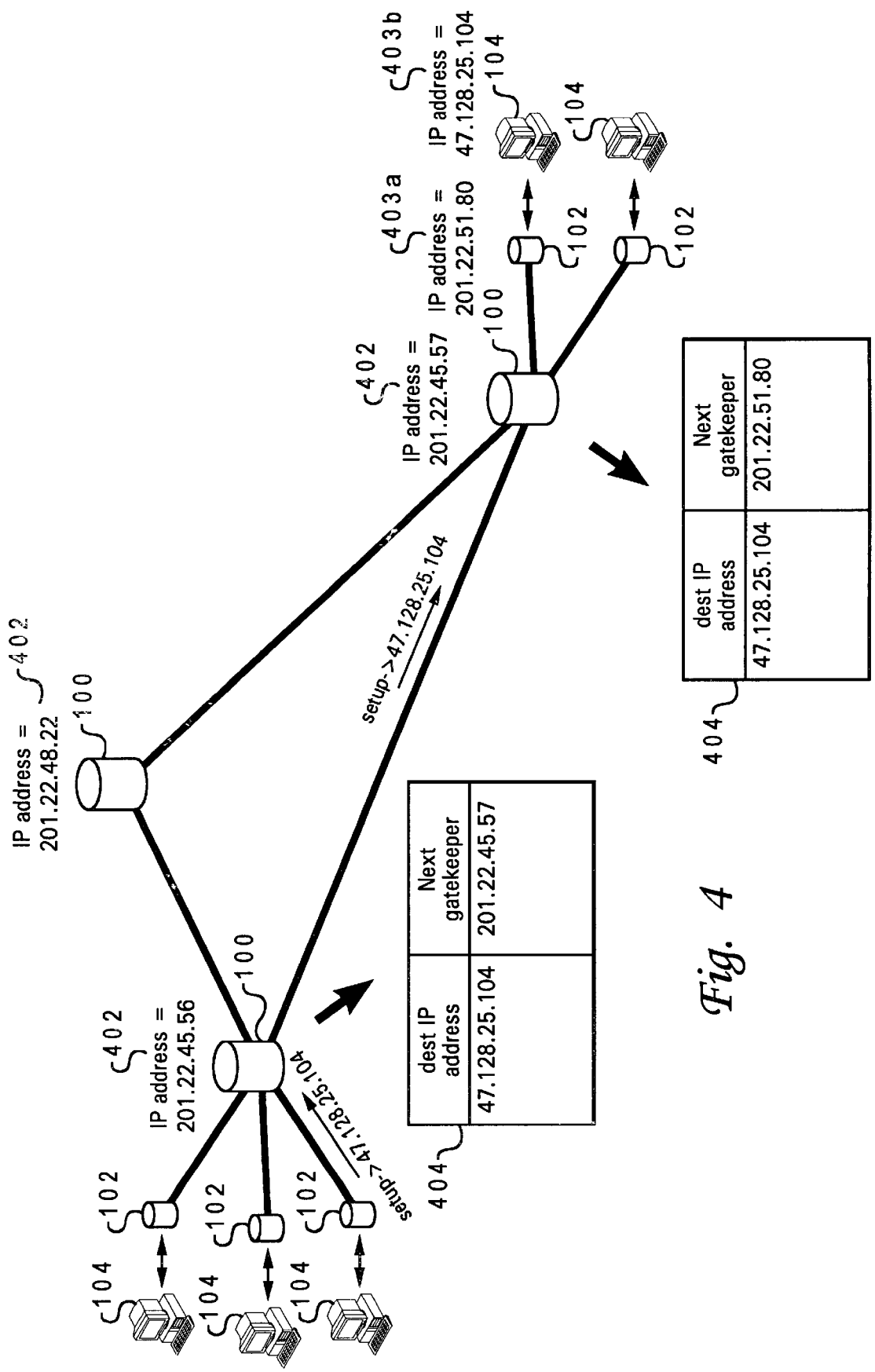
FIG. 4 is a diagram of a communications system illustrating the router tables and IP addresses according to the present invention.

FIG. 4 shows an example of such a routing table 404 for an example message. In the first column of routing table 404 is the destination end-point or gateway's IP address 402. The second column of routing table 404 will specify the IP address 402 of the next gatekeeper (or the destination endpoint 403b or gateway 403a if that is appropriate). The way that these routing tables are constructed is exactly like OSPF. The operation of routing table 404 may be explained as follows.

Each node learns of its cost to its neighbors and the IP address directly reachable from them. Each node then broadcasts this information to its neighbors. Each neighbor, once it has received this information, then re-broadcasts this information to its neighbors except that they do not send it back to the node where the information came from and they observe the packet time to live and if that has expired they do not forward the packet. Also, the packet time to live is decremented. This way all the nodes learn of all the nodes neighbors and thus build the total network topology. Then they utilize the shortest path algorithms to find routes from themselves to all the other nodes. Then they can utilize the routing information from these algorithms to find the next node for each possible destination.

Figure 5:
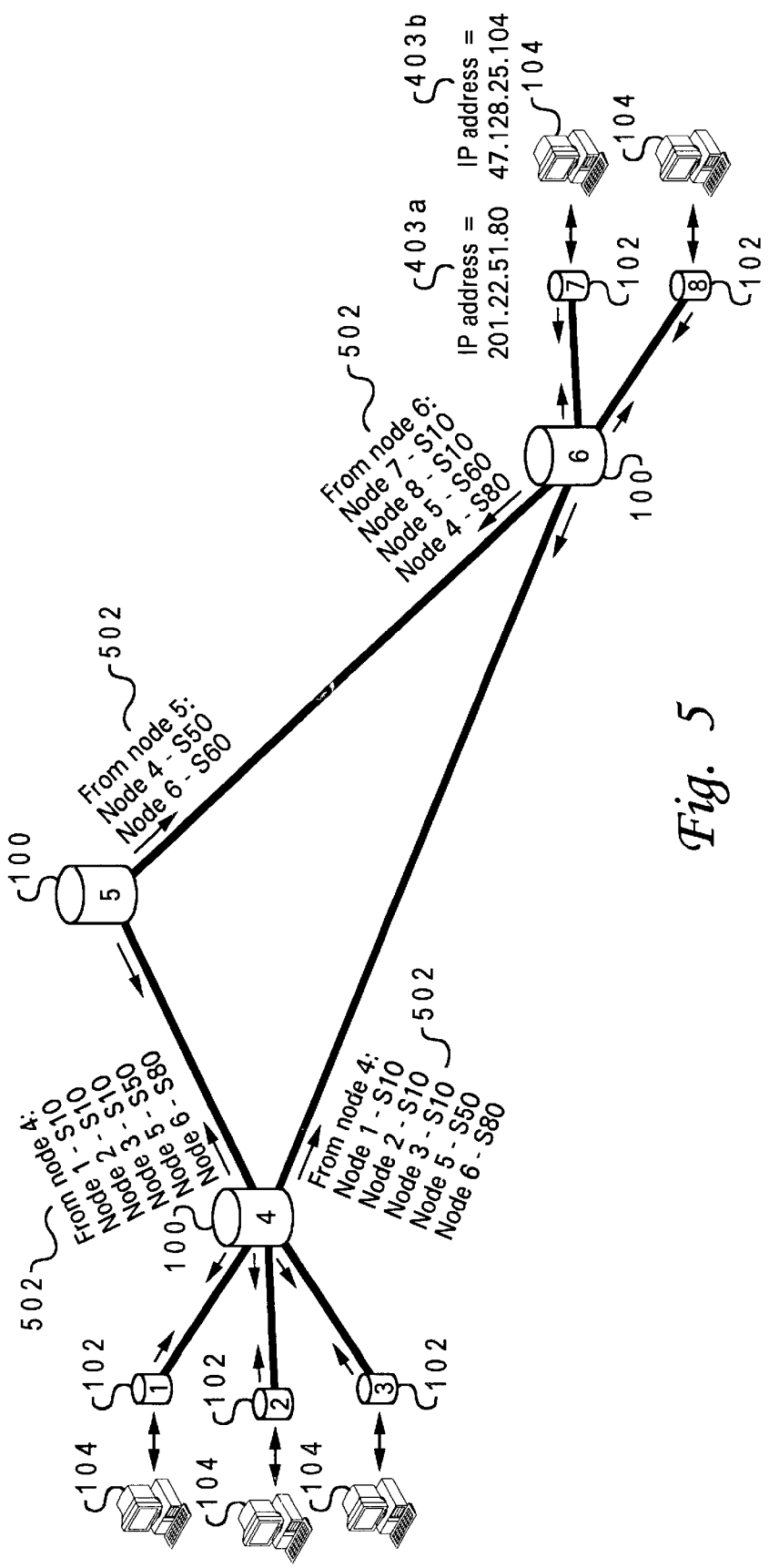
FIG. 5 is a diagram of a communications system illustrating the cost of data transfer within the system according to the present invention.

FIG. 5 shows the cost analysis for the transfer of data within the network according to one embodiment of the invention. Each node calculates its cost to its neighbors 502 and stores these costs within a database. The nodes will send information to each other to build routing tables. Each gatekeeper 100 will have information about all the logical links connecting it to other gatekeepers 100 in its internal database. This information will likely be input through a craftsperson or it could be updated automatically by the router connecting to gatekeeper 100. Once gatekeeper 100 receives a SETUP message (H.225) to a destination IP address, it first looks up the next node (gatekeeper) from the routing table and then link 106 to the next node. It then looks at all the existing connections through that logical link. If the effective bandwidth (CAC) of the new setup message is less than the remaining effective bandwidth, it allows the connection through and sends the SETUP message to the next gatekeeper.

Figure 6:
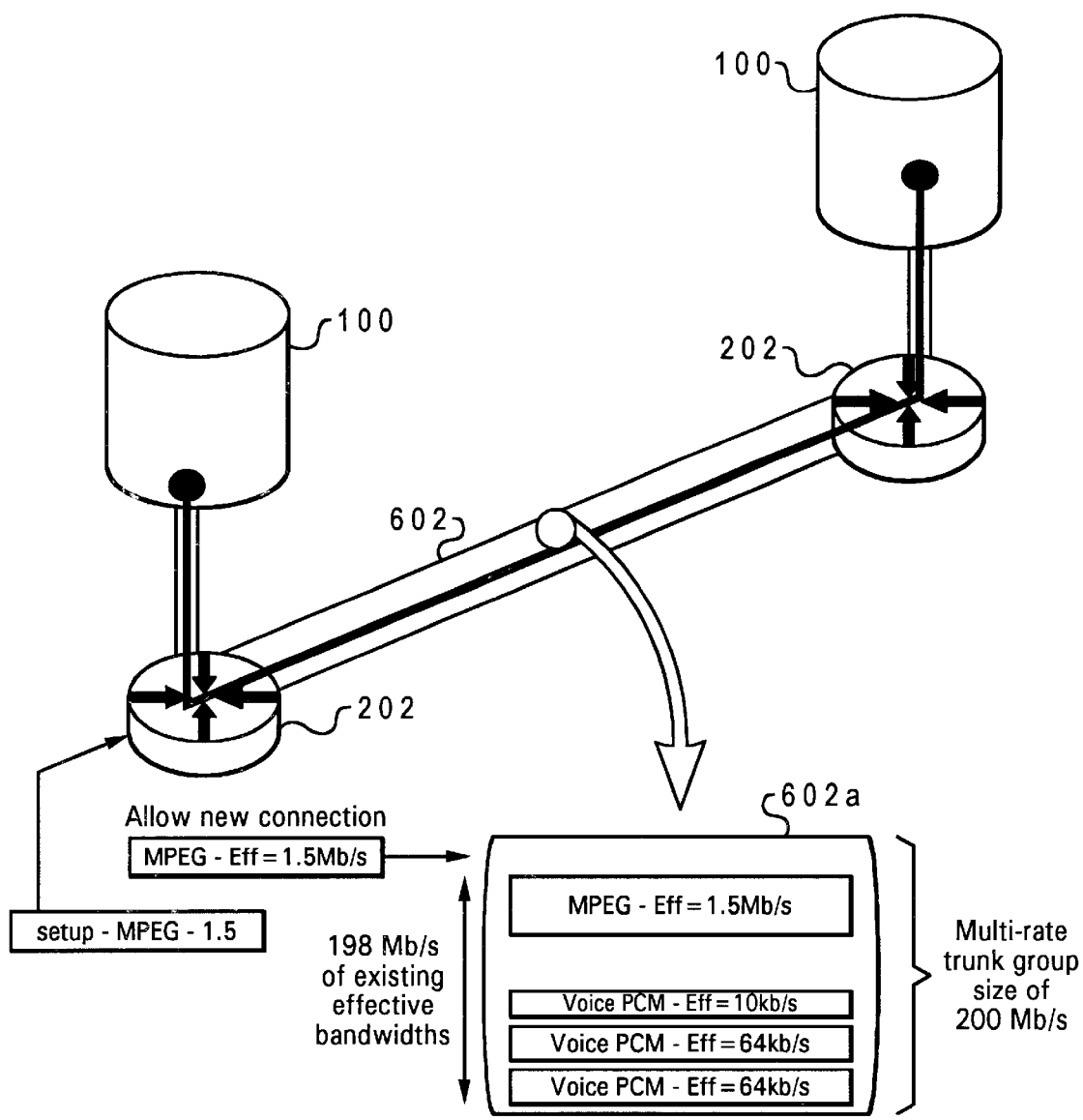
FIG. 6 depicts a link illustrating bandwidth allocation according to the present invention.

FIG. 6 depicts an example logical link 502 connecting gatekeepers 100 via routers 202 and which have 198 Mb/s of effective bandwidth of connections running between them. Note that logical link 602 is divided into sub-potions dedicated to different types of data traffic 602a. If a SETUP message is received which requests an additional 1.5 Mb/s of effective bandwidth for a new connection, this connection is then accepted because the total effective bandwidth is still under the 200 Mb/s of bandwidth for the logical link.

Figure 7:
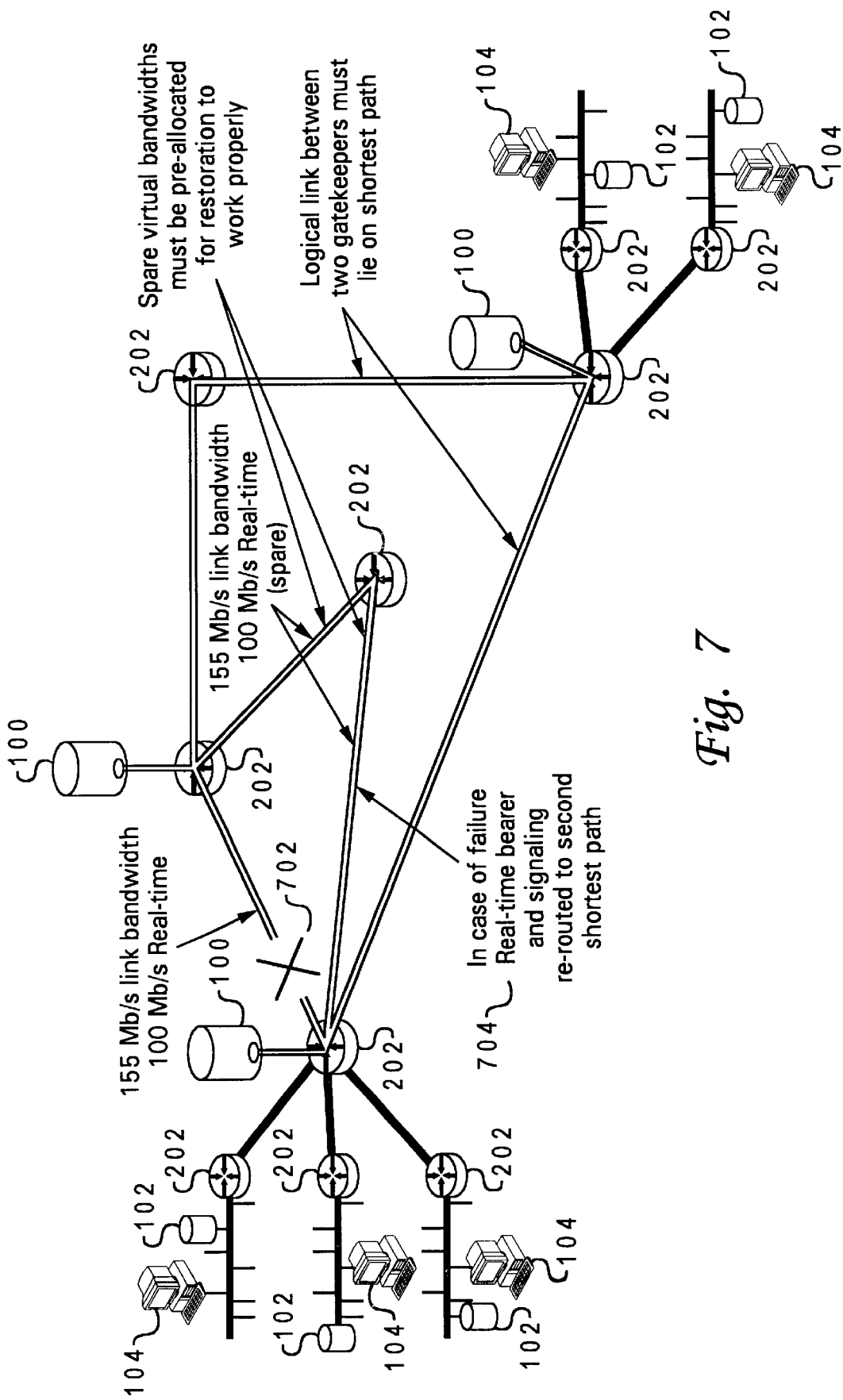
FIG. 7 is a diagram of a communications system illustrating a broken logical link and the re-routing of data according to the present invention.

FIG. 7 depicts what happens if a logical link between gatekeepers 100 gets disconnected due to fiber cuts 702 or due to other reasons. The bearer packet would then take second shortest path 704 according to OSPF for the type of service for real-time services. If prior real-time bandwidth is allocated on this path using WFQ, then the performance of the connection on that logical link is not affected.

In this embodiment, logical links between two gatekeepers lie on the shortest path between the gatekeepers according to the weights on the links for the real-time type of service, and spare capacity for each of the above logical links (if allocated) lie on the second shortest path between the respective gatekeepers.

The description of the preferred embodiment of the present invention has been presented for purposes of illustration and description, but is not intended to be exhaustive or limit the invention in the form disclosed. For example, although IP data packets are routed in the depicted examples, other types of data packets also may be routed according to the present invention. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A system for routing of real time data traffic on a communications network comprising:
   a plurality of gatekeepers linked together to form a network wherein said plurality of gatekeepers control bandwidth and routing of data packets towards destination terminals;
   a plurality of routers which aggregate real time flow of data packets through said gatekeepers;
   terminals which are connected to the network via said gatekeepers and which negotiate connection parameters;
   means for compiling external routing information for each of said plurality of routers including shortest paths to each destination terminal;
   means for broadcasting said external routing information to other routers within said network to allow said other routers to update their external routing information and determine active neighboring routers, wherein a subsequent transmission from a first router only requires knowledge of a closest neighbor in a destination link; and control means for directing real time flow of said data packets from one end point terminal to another utilizing said gatekeepers and said routers, wherein real time traffic is allocated to a selected portion of a bandwidth of each link to provide efficient real time traffic transfer along with standard data traffic transfer;

wherein said routers and gatekeepers utilize a process of determining a shortest path between said routers and gatekeepers and further wherein the shortest paths are utilized in establishing the communications network at the logical level of said gatekeepers and at a different network level for said routers, wherein spare capacity for each logical link is allocated to a second shortest path between said routers and said gatekeepers.

2. The system of claim 1, further comprising a plurality of gateways wherein said gateways represent a collection of said terminals and said gateways translate other bearer protocols to the Internet Protocol to enable packet transfer within said network.

3. The system of claim 1, wherein said routers include software switching algorithms programmed with a predetermined percent representing a portion of a link's bandwidth reserved for real time traffic and further wherein said routers give a higher priority to said predetermined percent of the bandwidth reserved for real time traffic in routing data to its destination.

4. The system of claim 1, wherein said gatekeepers log routing information in a routing table comprising a first column indicating a first address node and a second column specifying a second address node, and wherein said routing table provides shortest paths of logical links between said first and second address nodes according to the weights on the logical links for real time traffic.

5. The system of claim 4, wherein said routing table further provides spare capacity for each logical link on a second shortest path between said two address nodes.

6. The system of claim 1, wherein each gatekeeper utilizes shortest path algorithm to interconnect with neighboring gatekeepers based on logical links determined from both cost of said gatekeeper to its neighbors and IP addresses directly reachable from said gatekeeper, and further wherein said logical links are utilized to build a network topology to find routes to other gatekeepers, said control means further comprising:

means for allocating a cost associated with each hop of a link connecting two terminals and determining total costs for each possible link between said two terminals; and means for dynamically evaluating a best route/link based on said cost; and means, responsive to more than one route/link having an equal cost, for distributing said real time traffic equally among each of said routes.

7. The system of claim 6, wherein a second shortest path with spare capacity is identified and wherein disconnection of said logical link between gatekeepers results in the data packets being directed to said second shortest path.

8. The system of claim 7, further comprising:

means for detecting changes to a router's link state that is propagated/broadcasted; and means, responsive to said detecting, for automatically re-calculating a best route for each router based on said changes.

9. A system for routing of real time data traffic on a communications network comprising:

a plurality of gatekeepers linked together to form a network wherein said plurality of gatekeepers control bandwidth and routing of data packets towards destination terminals;

a plurality of routers which aggregate real time flow of data packets through said gatekeepers, wherein said network formed by said gatekeepers and routers reduces variance and synchronizes packet transmission in the routing of data traffic;

terminals that are connected to the network via said gatekeepers and which negotiate connection parameters;

means for compiling external routing information for each of said plurality of routers including shortest paths to each destination terminal;

means for broadcasting said external routing information to other routers within said network to allow said other routers to update their external routing information and determine active neighboring routers, wherein a subsequent transmission from a first router only requires knowledge of a closest neighbor in a destination link;

control means for directing real time flow of said data packets from one end point terminal to another utilizing said gatekeepers and said routers, wherein real time traffic is allocated to a selected portion of a bandwidth of each link to provide efficient real time traffic transfer along with standard data traffic transfer;

enabling inelastic/real time traffic utilizing a Real-time Transport Protocol (RTP); and allocating bandwidth to different types of service included in the data packets utilizing weighted fair queuing (WFQ), wherein said plurality of gatekeepers utilize standards of data transfer which permit call-control of real time service on communication networks and allow terminals to negotiate bandwidth and coding requirements for said real time service prior to establishing connection with said gatekeepers and routers.

10. A method of routing of real time data traffic on a communications network comprising the steps of:

linking together a plurality of gatekeepers to form a network wherein said plurality of gatekeepers control bandwidth and routing of data packets towards destination terminals, and wherein further said plurality of gatekeepers utilize standards of data transfer which permit call-control of real time service on communication networks;

aggregating real time flow of data packets through said gatekeepers utilizing a plurality of routers, wherein said routers and gatekeepers utilize a process of determining the shortest path between said routers and gatekeepers;

establishing the communications network at the logical level of said gatekeepers and at a different level network for said routers utilizing the shortest paths;

negotiating connection parameters utilizing terminals which are connected to the network via said gatekeepers;

allowing terminals to negotiate bandwidth and coding requirements prior to establishing connection with said gatekeepers and routers by:

compiling external routing information for each router including shortest paths to each destination node; and broadcasting said external routing information to other routers within said network to allow said other routers to update their external routing information and determine active neighboring routers, wherein a subsequent transmission from a first router only requires knowledge of a closest neighbor in a destination link; and controlling real time flow of said data packets from one end point terminal to another utilizing said gatekeepers and said routers, wherein real time traffic is allocated to a selected portion of a bandwidth of each link to provide efficient real time traffic transfer along with standard data traffic transfer.

11. The method of claim 10, wherein said controlling step includes the step of translating other bearer protocols to the Internet Protocol to enable packet transfer within said network utilizing a plurality of gateways representing a collection of said terminals.

12. The method of claim 10, wherein said routers include software switching algorithms programmed with a predetermined percent representing a portion of a link's bandwidth reserved for real time traffic and further comprising the step of assigning a higher priority to said predetermined percent of the bandwidth reserved for real time traffic in routing data to its destination.

13. The method of claim 10, further comprising logging routing information in a routing table comprising a first column indicating a first address node and a second column specifying a second address node, wherein said routing table provides the shortest paths of logical links between said first and second address nodes according to the weights on the logical links for real time traffic.

14. The method of claim 13, further comprising the step of providing spare capacity for each logical link on a second shortest path between said two address nodes.

15. The method of claim 10, wherein each gatekeeper utilizes shortest path algorithms to interconnect with neighboring gatekeepers based on logical links determined from both cost of said gatekeeper to its neighbors and IP addresses directly reachable from said gatekeeper, and further wherein said logical links are utilized to build a network topology to find routes to other gatekeepers, said control means further comprising:

allocating a cost associated with each hop of a link connecting two terminals and determining total costs for each possible link between said two terminals; and dynamically evaluating a best route/link based on said cost; and responsive to more than one route/link having an equal cost, distributing said real time traffic equally among each of said routes.

16. The method of claim 15, wherein a second shortest path with spare capacity is identified and wherein disconnection of said logical link between gatekeepers results in the data packets being directed to said second shortest path.

17. A method of routing of real time data traffic on a communications network comprising the steps of:

linking together a plurality of gatekeepers to form a network wherein said plurality of gatekeepers control bandwidth and routing of data packets towards destination terminals, and wherein further said plurality of gatekeepers utilize standards of data transfer which permit call-control of real time service on communication networks;

aggregating real time flow of data packets through said gatekeepers utilizing a plurality of routers wherein the network formed by said gatekeepers and routers is utilized to reduce variance and synchronizes packet transmission in the routing of data traffic;

negotiating connection parameters utilizing terminals which are connected to the network via said gatekeepers;

allowing terminals to negotiate bandwidth and coding requirements prior to establishing connection with said gatekeepers and routers by:

compiling external routing information for each router including shortest paths to each destination node; and broadcasting said external routing information to other routers within said network to allow said other routers to update their external routing information and determine active neighboring routers, wherein a subsequent transmission from a first router only requires knowledge of a closest neighbor in a destination link;

controlling real time flow of said data packets from one end point terminal to another utilizing said gatekeepers and said routers, wherein real time traffic is allocated to a selected portion of a bandwidth of each link to provide efficient real time traffic transfer along with standard data traffic transfer;

enabling inelastic/real time traffic utilizing a Real-time Transport Protocol (RTP); and allocating bandwidth to different types of service included in the data packets utilizing weighted fair queuing (WFQ), wherein said plurality of gatekeepers utilize standards of data transfer which permit call-control of real time service on communication networks and allow terminals to negotiate bandwidth and coding requirements for said real time service prior to establishing connection with said gatekeepers and routers.

* * * * *